US006749752B2

(12) United States Patent
Trout

(10) Patent No.: US 6,749,752 B2

(45) Date of Patent: Jun. 15, 2004

(54) SYSTEM FOR REMOVING OIL FROM FOODSTUFFS USING A MEMBRANE FILTER

(75) Inventor: Richard B. Trout, Media, PA (US)

(73) Assignee: CocoTech, Inc., Swedesboro, NJ (US)

( * ) Notice: Subject to any disclaimer, the term of this patent is extended or adjusted under 35 U.S.C. 154(b) by 0 days.

(21) Appl. No.: 10/323,508

(22) Filed: Dec. 19, 2002

(65) Prior Publication Data

US 2003/0077367 A1 Apr. 24, 2003

Related U.S. Application Data

(62) Division of application No. 09/801,440, filed on Mar. 8, 2001, now Pat. No. 6,551,642.

(51) Int. Cl.[7] ................................................ B01D 36/00

(52) U.S. Cl. .................. 210/259; 210/182; 210/321.87; 210/511; 210/512.1

(58) Field of Search .............................. 210/175, 195.1, 210/195.2, 182, 258, 259, 321.87, 321.88, 416.1, 512.1, 651, 634, 774, 788, 805, 806; 426/417, 478, 479, 492, 493, 494, 629; 554/9, 12, 13, 16, 20

(56) References Cited

U.S. PATENT DOCUMENTS

| | | | |
|---|---|---|---|
| 4,062,882 | A | 12/1977 | Gupta |
| 4,414,157 | A | 11/1983 | Iwama et al. |
| 4,533,501 | A | 8/1985 | Gupta |
| 4,617,177 | A | 10/1986 | Schumacher |
| 4,758,444 | A | 7/1988 | Terauchi et al. |
| 5,120,900 | A | 6/1992 | Chen et al. |
| 5,166,376 | A | 11/1992 | Suzuki et al. |
| 5,252,218 | A | 10/1993 | Muraldihara et al. |
| 5,281,732 | A | 1/1994 | Franke |
| 5,310,487 | A | 5/1994 | LaMonica |
| 5,405,633 | A | 4/1995 | Heidlas et al. |

(List continued on next page.)

FOREIGN PATENT DOCUMENTS

| | | |
|---|---|---|
| GB | WO 94/21362 | 9/1994 |

OTHER PUBLICATIONS

Brochure—SCEPTER® Stainless Steel Membrane Systems, Proven Technology For the Most Challenging Separations, Graver Technologies—© 1999 Graver Technologies; Pub. Date unknown.

*Primary Examiner*—Joseph Drodge
(74) *Attorney, Agent, or Firm*—RatnerPrestia

(57) ABSTRACT

A process and system for extracting a solute from a solid material, such as oil from oil-bearing foodstuffs, utilize a substantially tubular membrane filter to separate a mass of the extracting medium and the foodstuffs into a miscella and foodstuffs of reduced oil content. In a batch or continuous process, after each extracting stage, the mass from the extraction vessel is conveyed to a membrane filter, which has pores along its cylindrical walls suitably sized to allow a miscella to pass as the permeate, while causing the foodstuffs of reduced oil content to be conveyed axially along the tubes and out of its ends as the retentate. In a continuous process, extractor cells, or stages, consisting of an extraction vessel, pump, and membrane filter, are used in sequential stages, preferably using a miscella from the subsequent stage as the extracting medium. In a batch process, miscella storage tanks may be used to store miscella from the final stage for use in the next batch. In either case, only miscella having the highest oil content, namely the miscella from the first stage, is conveyed to a separator for recovery of the oil. Of particular value is the use of this process or system in extracting oil from foodstuffs which are in the form of powders, have high oil content, or are sensitive to heat.

5 Claims, 2 Drawing Sheets

U.S. PATENT DOCUMENTS

| | | | | |
|---|---|---|---|---|
| 5,525,746 | A | | 6/1996 | Franke |
| 5,545,329 | A | | 8/1996 | LaMonica |
| 5,707,673 | A | | 1/1998 | Prevost et al. |
| 5,728,851 | A | | 3/1998 | Franke |
| 5,739,364 | A | | 4/1998 | Franke |
| 5,961,835 | A | | 10/1999 | Sarrade et al. |
| 5,985,151 | A | | 11/1999 | Ahmadi |
| 6,024,880 | A | | 2/2000 | Ciora, Jr. et al. |
| 6,066,350 | A | | 5/2000 | Purtle et al. |
| 6,075,073 | A | | 6/2000 | McGlothlin et al. |
| 6,093,325 | A | | 7/2000 | Stone |
| 6,111,119 | A | * | 8/2000 | Trout .......................... 554/16 |
| 6,207,209 | B1 | | 3/2001 | Jirjis et al. |
| 6,375,843 | B1 | | 4/2002 | Potter et al. |
| 6,551,642 | B2 | * | 4/2003 | Trout ......................... 426/489 |

* cited by examiner

SYSTEM FOR REMOVING OIL FROM FOODSTUFFS USING A MEMBRANE FILTER

CROSS-REFERENCE TO RELATED APPLICATIONS

This application is a division of U.S. patent application Ser. No. 9/801,440, filed Mar. 8, 2001, now U.S. Pat. No. 6,551,642, issued an April 22, 2003.

FIELD OF THE INVENTION

The present invention relates to extracting a solute from a solid material and, more particularly, to extracting oil from oil-bearing foodstuffs.

BACKGROUND OF THE INVENTION

Many food products contain varying amounts of oil, i.e., liquid triglycerides, which can be extracted as a valuable commodity. Such food products include cocoa and other plant materials, such as oil seeds, cereal brans, fruits, beans, berries, and nuts. There are numerous important commercial uses of the oils derived from such plant materials, such as in cooking, confectionery, cosmetics, pharmaceuticals (as carriers), lubricants, and other applications. In the case of some food products, the defatted food product might also have some commercial or industrial use. Accordingly, numerous processes aimed at extracting and separating such oils have been proposed.

Organic solvents are frequently used as the medium for extracting oil from such food products. In a conventional extraction process, the oil-bearing food product is treated with a suitable solvent, usually a lower carbon alkane, such as propane, butane, or hexane, to extract the oil from the oil-bearing food product. The constituents of the resulting solvent/oil mixture, called a "miscella," are then separated from one another, typically in a distillation unit. In this way, the isolated oil product can be recovered and the solvent can be recycled.

A common commercial solvent employed is hexane, which, although widely used for the recovery of oils, is not well suited for the recovery of food quality solids. This solvent is considered toxic, and the conditions necessary for minimizing residual solvent in the solids (both high temperature and use of direct steam injection), adversely affect desired properties, such as flavor and aroma. Increasing interest in reduced fat foods has resulted in the increased use of normally gaseous solvents, such as super critical carbon dioxide, liquid propane, and liquid butane for the removal of fats and oils. These solvents, which are commercially in use for the extraction of foodstuffs, are typically used in a batch-type extraction process.

Although continuous extraction provides certain economies, including the ability to use countercurrent flow of solvent, the pressures required present significant technical hurdles. Maintaining a seal between the atmospheric environment and the pressurized vessels is difficult. Dealing with fine particles necessitates either pelletizing a feed stock or complex filtering processes which are further complicated by operating in a pressurized environment. Also, when using normally liquid solvents, certain products create difficulties when preparing the material for extraction.

For example, the preparation of oil seeds for extraction involves rupturing of cells and the production of flakes, pellets or collets to increase surface area, porosity, and facilitate contact and draining of the solvent/oil mixture.

However, large particles, such as pellets, although reducing channeling and allowing for improved draining, also inhibit the leaching of the solute from the solid, necessitating a longer extraction time. Other products, such as rice bran, are unstable and subject to oxidation degradation when exposed to conditions, including heat or air exposure, such as are experienced when pelletizing. Also, products that are initially high in oil/fat content, such as peanuts or cocoa beans, after cell rupture, must be further processed to remove a portion of the oil/fat in order to prepare solid pieces for extraction. In other words, with such a high oil content, these products form a flowable mass, a difficult form from which to extract oil using conventional processes.

In summary, several problems exist with current extracting processes which make the process either more difficult, more expensive, or result in poorer quality. Hexane is not satisfactory for foodstuffs when the solids are of interest. In addition, normally gaseous solvents do not lend themselves readily to continuous processes. Moreover, pelletizing can degrade certain products and extend the extraction time for others.

In view of the prior art extraction methods and their shortcomings, there exists a need for an extraction process and system which can be used on a continuous or batch basis and which can be used to extract oil from foodstuffs in a number of forms, including powder. Preferably, the system should be able to accommodate normally gaseous solvents in a continuous process.

SUMMARY OF THE INVENTION

In view of its purposes, an embodiment of the present invention provides a process for extracting a solute from a material comprising first mixing a liquid extracting medium with a solid material in an extraction vessel to form a first mass. Next, the first mass is passed through a substantially tubular membrane filter for separating a miscella, which is some of the solute and the solvent from the extraction medium, from a second mass having a reduced solute content and the rest of the solvent. The solvent is then removed from the miscella to isolate the solute and from the second food mass to form reduced solute, desolventized foodstuffs.

According to an embodiment of the present invention, a batch process for extracting a solute, such as oil, from a material, such as oil-bearing foodstuffs, involves first mixing solid foodstuffs and a liquid extracting medium in an extraction vessel to form a first mass, which is passed through a substantially tubular membrane filter for separating a miscella from a second mass, as above. After returning the second mass to the extraction vessel, extracting medium is again mixed with the second mass to form a third mass, which is again passed through the membrane filter for separating a miscella from a fourth mass. The solvent is then removed from the miscella to isolate the solute and from the fourth mass to form reduced solute, desolventized foodstuffs.

According to an embodiment of the present invention, a continuous process for extracting a solute, such as oil, from a material, such as oil-bearing foodstuffs, involves first mixing solid foodstuffs and a liquid extracting medium in a first extraction vessel to form a first mass, which is passed through a substantially tubular membrane filter for separating a miscella from a second mass, as above. The second mass is then mixed with extracting medium in a second extraction vessel to form a third mass, which is passed through a second substantially tubular membrane filter for separating a miscella from a fourth mass. The solvent is then removed from the miscella to isolate the solute and from the fourth mass to form reduced solute, desolventized foodstuffs.

According to another embodiment of the present invention, a system for extracting oil from oil-bearing foodstuffs comprises an extraction vessel, a substantially tubular membrane filter having an average pore size of between 0.1 microns and 10 microns, a separator, and means for removing the solvent from a mass conveyed from the membrane filter. More specifically, the extraction vessel accommodates the mixing of a liquid extracting medium with solid foodstuffs to form a first mass. The membrane filter is coupled to the extraction vessel and serves to separate a miscella from a second mass. The separator is coupled to the membrane filter, receives the miscella from the membrane filter, and serves to remove the solvent in the miscella to isolate most of the oil. Finally, the means for removing the solvent in the second mass to form reduced oil, desolventized foodstuffs might include a heater, a depressurizer, or a baghouse.

It is to be understood that both the foregoing general description and the following detailed description are exemplary, but not restrictive, of the invention.

BRIEF DESCRIPTION OF THE DRAWING

The invention is best understood from the following detailed description when read in connection with the accompanying drawing, in which.

DETAILED DESCRIPTION OF THE INVENTION

Figure 1:
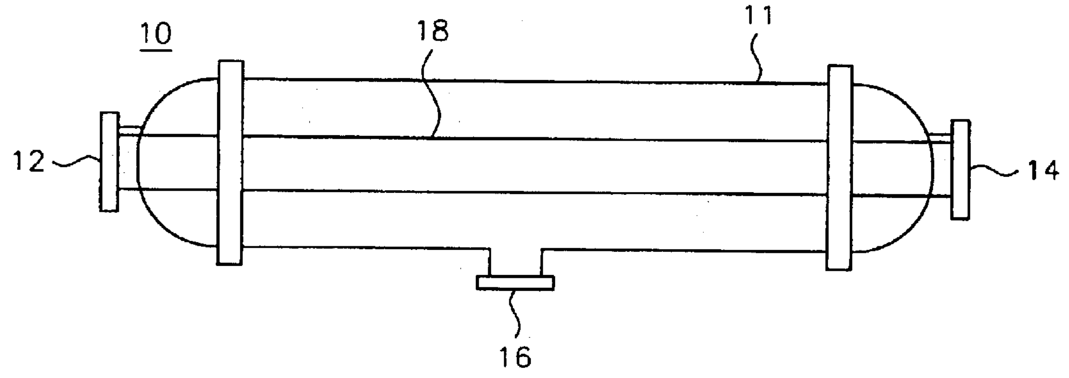
FIG. 1 is a schematic diagram of a tubular membrane filter for use in connection with the present invention.

The process of the present invention may be used to remove a solute from a solid material. The range of materials which can be used as a raw feed in the present invention is broad and includes all substances with some food, pharmaceutical, or nutraceutical value. One class of such material is "foodstuffs," which is a substance with food value, including the raw material of food before or after some processing. In principal, all natural products containing fats, oils, or waxes derived from plants, animals, or marine life, can be treated by the process of the present invention, so long as a suitable extracting medium which exists as a liquid at the operating conditions can be identified. Non-limiting examples of material to be treated according to the present invention include selected forms of cocoa beans (including, but not limited to cocoa mass/chocolate liquor, cocoa powder, crushed cocoa presscake, and chocolate), peanuts, soybeans, cottonseed, linseed, canola, and cereals such as rice bran, wheat bran, and cornmeal. As used herein, the term "solid," when modifying the material or foodstuff being treated, means that at least some portion of the material or foodstuff exists as a solid at the extraction conditions and is not readily extracted by the extracting medium. This solid portion of the material refers to, for example, defatted cocoa powder, as opposed to cocoa butter which is more readily dissolved into the extracting medium.

The form of the material or foodstuffs may be any known form which is flowable or can be rendered flowable. One way in which a material or foodstuff can be rendered flowable is by combining it with a solvent. Exemplary forms of such material or foodstuffs are fine particles (i.e., powders) or slurries. The system of the present invention is particularly useful for the treatment of powdered foodstuffs, which are difficult to treat using prior art extraction schemes, and foodstuffs having a high initial solute or oil content (e.g., above 35%, 40%, or 50% by weight). The invention is also particularly useful for treating foodstuffs which are sensitive to air or heat (such as rice bran), or which require pressure or vacuum extraction systems. If the starting material (especially when solid) has a high moisture content, then it is helpful to reduce the moisture content before extracting to under fifty percent by suitable drying methods.

As used herein, the term "oil" will refer to both oil in its liquid form and in its solid form (i.e., fat or fatty acids) for convenience. Non-limiting examples of oils which can be removed from the foodstuffs include cocoa butter, olive oil, palm oil, coconut oil, coffee oils, peanut butter, rape oil (rape-seed oil), sunflower oil, wheat germ oil, rice bran oil, cottonseed oil, maize germ oil, soybean oil, palm kernel oil, canola oil, and pumpkin seed oil. Oils from beef, veal, and marine animals such as fish can also be separated according to the present invention. In many cases, such as with cocoa, the defatted solid is also a valuable commodity.

Suitable solvents for use in the present invention include any solvent which is normally a liquid or a supercritical fluid at extraction conditions, and in which the substance to be extracted is soluble in the solvents under the extraction conditions. The selection of the appropriate solvent (or combinations of solvents) can thus be made based on its (their) known solubility characteristics with respect to the solute being removed. If it is necessary to selectively remove certain substances, then the solubility of those substances must be considered in the selection of the solvent (or combination of solvents), as well as the operating conditions used in the process. In addition, the pressure and temperature needed to liquefy the solvent should be considered in view of the pressure and temperature that the components of the system are rated for.

Depending on the particular type of substances being removed, solvents suitable for use in the present invention could include carbon dioxide and low molecular weight alkanes, for example propane, butane, pentane, or hexane and alcohols, such as ethanol. Preferred solvents are those which are normally gases at the typical atmospheric conditions, i.e., room temperature (e.g., 70° F.) and atmospheric pressure. Most preferable for the removal of cocoa butter from cocoa powder are normally gaseous solvents, especially propane or butane or mixtures thereof.

As used herein, the term "liquid extracting medium" is used to connote a medium which is in liquid form at extraction conditions and encompasses pure solvent and a mixture of some solvent and some solute, such as oil. A "miscella" is a liquid passing through a membrane filter as a permeate (as described below) and contains both the solvent and the oil. Thus, a miscella from one stage in a continuous process may be used as the liquid extracting medium in a previous stage. For identifying the stage number herein, a higher stage number will correlate with a decreased solute content of the material, for both continuous and batch processes. The term "full miscella" is used to identify the miscella exiting from the first extraction stage and has the highest concentration of solute.

One application of the present invention is the removal of cocoa butter from cocoa powder and/or cocoa mass. The refinement of raw cocoa includes roasting the cocoa beans at about 300° F. for about 30 to 90 minutes to develop the flavor of the cocoa and to drive off some moisture inherent in the cocoa bean. Also, the thin shells of the beans are removed from the nib. Typically, the beans are first roasted then de-shelled, although this order is reversed in some processes. After roasting and de-shelling, the cocoa nib is ground and forms a flowable mass because of its high fat content, about 50% by weight. This form of cocoa is commonly known as cocoa mass or chocolate liquor, which solidifies at around 94° F. If further refinement is desired, this form of cocoa is defatted to about 10–12% fat by using hyrdraulic press for the purpose of removing some of the fat from the cocoa, which in turn forms a solid, hard cocoa press cake.

The present invention is particularly well-suited to defat cocoa powder having any range of initial cocoa butter content, for example 50% or higher or at any intermediate range such as 40%, 30%, 20%, or the 10–12% cocoa butter content of press cake. In addition, the process and system of the present invention can be used to defat any of these forms of cocoa powder and reduce the fat content down to about 1% fat (or below, although it might not be commercially desirable to do so), and also can be used to remove fat from any form of cocoa during the refinement process described above, even unroasted cocoa, with or without shell pieces. A use of a defatted cocoa/shell mixture is as fertilizer.

In the description of the embodiments shown in the drawing, much of the materials typically used in connection with this process (for example, the materials for the extraction vessel or solvent tank) and most of the process conditions (e.g., temperature and pressure in the extraction vessel and distillation unit) are all well known. Unless otherwise noted below, typical materials and processing parameters can be used in each process step. These materials and process parameters can be optimized in any known manner, except where indicated below.

Referring now to the drawing wherein the same reference numerals refer to the same element, FIG. 1 shows a substantially tubular membrane filter 10 for use in connection with the present invention. Membrane filter 10 has an outer housing 11, an inlet 12, a retentate outlet 14, and a permeate outlet 16. Extending within housing 11 is at least one filter sleeve 18 which is parallel to the axis of housing 11. Although only one filter sleeve 18 is shown in FIG. 1, most commercial embodiments of the membrane filter have a much higher number of filter sleeves running generally parallel to one another and to the axis of housing 11.

Filter sleeve 18 is a porous material which permits particles having a diameter below a certain size to flow through the wall of filter sleeve 18 (also known as trans-membrane flow) while retaining larger particles radially within filter sleeve 18. Thus, as a mass containing a solvent, insoluble solids, and a solute flows axially along and through the wall of filter sleeve 18 from inlet 12 to retentate outlet 14. By creating a back-pressure downstream of retentate outlet 14, some of the materials in the mass are caused to flow radially outward and through the wall of filter sleeve 18. In the present invention, the pores at filter sleeve 18 are sized to permit the solute and solvent to flow through the wall of filter sleeve 18 while the solids (as well as some of the solvent) are retained within filter sleeve 18. In this way, membrane filter 10 serves to separate a feed mass (e.g., foodstuffs having an initial oil content plus solvent) into a miscella, which is made up of the solute and some of the solvent, from another mass of material including solids having a reduced solute content and the remaining solvent. The miscella flows out permeate outlet 16 as the permeate, while the reduced solute content mass flows out retentate outlet 14 as the retentate.

The size and material of filter sleeve 18 can be easily selected depending on the material being treated, the solute being withdrawn from the material, and the extracting medium used, as well as other parameters such as the desired operating conditions and desired purity level of both the miscella and, ultimately, the isolated solute product. For many of the applications suitable for use with the present invention, a microfiltration filter having a pore size between about 0.1 microns to 10 microns is suitable, although this will vary depending on the factors mentioned above, as well as others. The material of filter sleeve 18 can also vary so long as it is sufficiently porous to achieve the desired results and can withstand the extraction conditions. It has been found that sintered stainless steel is acceptable. It may also be desirable to include a coating formed on the sintered stainless steel. For example, it has been found that certain coatings appear to reduce pore size and minimize fouling (i.e., the blockage of the pores by solid particles being deposited therein). One type of coating which has been shown to be useful is a titanium dioxide coating. Another type of coating is an organic coating. These coatings are preferably formed on the radially inner surface of sleeve filter 18. A number of membrane filters are commercially available, but it has been found that a Scepter® stainless steel membrane system, available from Graver Technologies of Glasgow, Del., which is a sintered stainless steel membrane filter having a titanium dioxide coating, has been found to be useful in the present invention. For the extraction of cocoa butter by propane or butane, this membrane having a nominal pore size of 0.1 microns has been found to be preferable.

Figure 2:
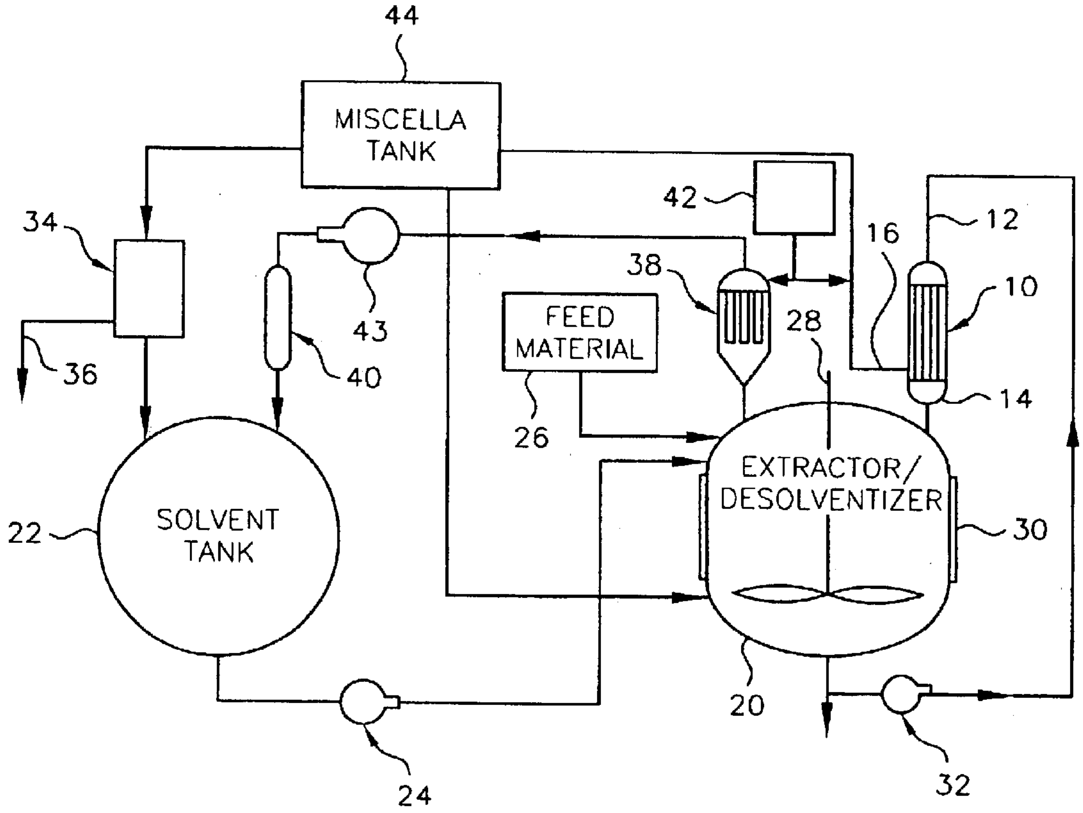
FIG. 2 is a schematic diagram of a system suitable for use in a batch extraction process in accordance with the present invention.

Referring to FIG. 2, a system in accordance with the present invention is shown. A membrane filter 10 is coupled to and in fluid communication with an extraction vessel 20. In the embodiment shown in FIG. 2, extraction vessel 20 also serves as a desolventizer, although a separate vessel could be used as a desolventizer. Extraction vessel 20 accommodates a liquid extracting medium which comprises a solvent delivered from a solvent tank 22 via pump 24 and a feed material, such as cocoa powder, from feed material hopper 26. An impeller 28 serves to mix the materials, such as the liquid extracting medium and solid foodstuffs having an initial oil content, in extraction vessel 20 to form a first mass. Heating jacket 30 may be used to provide heat by any conventional means, such as by steam, either directly or indirectly. A pump 32 serves to deliver the first mass to inlet 12 of membrane filter 10 and drive retentate through membrane filter 10 and out retentate outlet 14 and back to the extraction vessel 20. Thus, in this configuration, membrane filter 10 is external relative to extraction vessel 20.

The system also includes a separator, such as distillation unit 34, for receiving the miscella from permeate outlet 16 of membrane filter 10 and removing the solvent in the miscella to isolate a portion of the solute, which flows out product flow line 36. The substantially pure solvent is then returned to solvent tank 22. The system also includes a baghouse or a cyclone represented by reference numeral 38 coupled to and in fluid communication with extraction vessel 20 for receiving gaseous solvent and entrained particles from the solid material and effecting further separation of the entrained particles from the gaseous solvent. Again, the purified gaseous solvent is condensed in condenser 40 and returned to solvent tank 22.

The system shown in FIG. 2 also includes a high pressure fluid backflush source 42 which is coupled to both the permeate side of membrane filter 10 as well as the downstream side of baghouse 38 away from extraction vessel 20. Backflush source 42 is configured to provide solvent flow (or some other fluid, such as a cleaning fluid) in a direction opposite the direction of normal flow during extraction. Generally, it is desirable to use the same solvent as used during extraction in liquid form to backflush membrane filter 10 and the same solvent as used during extraction in vapor form to backflush baghouse or cyclone 38.

Much of the operation of the present invention is similar to that described in U.S. Pat. No. 6,111,119 entitled "Process for Removing Oil From Food Products," incorporated herein by reference. For example, in carrying out a batch process for extracting oil from oil-bearing foodstuffs, the preliminary purging of extraction vessel 20 with an inert gas as described in that patent should be done. In addition, feed material hopper 26 may be configured by a number of known methods, such as those described in the '119 patent.

After these preliminary steps, the solid foodstuffs having a first oil content are mixed with a liquid extracting medium, such as substantially pure propane or butane delivered from solvent tank 22 via pump 24. The time and temperature of extraction can be determined by one skilled in the art and depend on a number of factors, including the desired level of extraction. Mixing by impeller 28 is also done in a known manner, and contact time and mixing are provided in amounts sufficient to dissolve the solute and the solvent to the desired level. When cocoa powder is used, this time and mixing is relatively rapid due to the short travel path within the small particles.

With respect to any form of cocoa which has an oil content sufficient to render it flowable under the conditions of extraction (typically heated above the melting temperature of cocoa butter), then the feed material 26 can be directly applied to the inlet 12 of membrane filter 10, without adding any solvent to the feed material. Such a form of cocoa includes cocoa mass/chocolate liquor. As during other operation, a backpressure is applied by placing a valve in communication with retentate outlet 14, thereby forcing some of the oil to flow across filter sleeve 18 as expressed oil and exit membrane filter 10 via permeate outlet 16. Prior to the addition of any solvent, this permeate is fed directly to product flow line 36 and recovered as product. This process may be continued until this form of cocoa, now having a reduced amount of oil, does not have sufficient oil to render it flowable. Typically, this occurs at about 35–40% cocoa butter. Only at that point would solvent need to be added to form a flowable mass.

Thereafter, the mass from extraction vessel 20 is conveyed via pump 32 to inlet 12 of membrane filter 10 which separates the mass into a miscella passing through the wall of filter sleeve 18 and out permeate outlet 16 as permeate. The miscella includes the portion of the oil which has been extracted as well as some of the solvent. The retentate exiting retentate outlet 14 is made up of the foodstuffs having a decreased oil content as well as the rest of the solvent. This mass is then returned to extraction vessel 20 where it is mixed with an additional extracting medium in an additional extracting stage to form a third mass which is again conveyed to membrane filter 10 in the same manner as before. (One or more additional extraction vessels may be used to run multiple extraction batches simultaneously.) Meanwhile, the miscella from all stages or after more than one stage is directed to distillation unit 34 which serves to distill miscella into substantially pure solvent flowing to solvent tank 22 and solute recovered via product flow line 36 as product. The sequence of steps can be continued as many times as deemed desirable.

Either after each extraction stage or some number of extraction stages (such as every other stage, as need) heat jacket 30 serves to heat the extractor/desolventizer 20 which now functions as a desolventizer. In particular, upon the application of heat, the solvent remaining in the extractor is vaporized and the valves are opened and closed around extractor (not shown) to create a flow path toward baghouse 38. Bag house 38 serves to separate any entrained particles from the gaseous solvent. In addition to heating, reducing the pressure in the mass in the extractor/desolventizer 20 can be done by using a vapor compressor 43. In addition, or as an alternative to the baghouse, a cyclone may be used to separate any entrained particles. Then, the gaseous solvent is condensed in condenser 40 and returned to solvent tank 22.

Also, periodically, high pressure backflush fluid from source 42, which could contain the same solvent being used for extraction, is applied to the downstream side of baghouse 38, preferably as a vapor, and the permeate outlet side of membrane filter 10, as a liquid or a vapor. This can be achieved in any known manner, such as, by using pumps and opening and closing valves around these components to provide a flow in the reverse direction. This backflushing causes dislodging of any entrained particles in the baghouse filter as well as the dislodging of any solids from filter sleeve 18.

The type of membrane and the particle size distribution of the solids dictates the need, if any, to backflush. The pressure used, time, and frequency for this backflush can vary over a wide range. In the case of cocoa solids, however, it has been found that applying a back pressure equal to at least 75% of the transmembrane pressure during extraction for a period of at least two seconds, more preferably five seconds, is desirable. The transmembrane pressure is proportional to the rate of filtering. It has been found that a pressure of at least 50 psi, but more preferably 75–100 psi, is effective. As used herein, the term "transmembrane pressure" can be measured by taking an average pressure drop from the inside of the sleeve to the outside of the sleeve.

As an alternative to the embodiment shown at FIG. 2, a miscella storage tank 44 may be placed between permeate outlet 16 of membrane filter 10 and distillation unit 34. In this way, distillation unit 34 need not run continuously but only until a sufficient amount of miscella, more preferably full miscella, is delivered to the miscella storage tank. In addition, miscella from a first batch (i.e., a batch is defined by the placement of new feed material in the extractor, with each batch having any number of stages) can be used with a new batch. For this purpose, a number of miscella storage tanks may be used as described in the '119 patent. Although not shown, the filter section can also be periodically cleaned in place with chemicals such as detergents, optimally by using the same conduit as high pressure backflush fluid 42.

Figure 3:
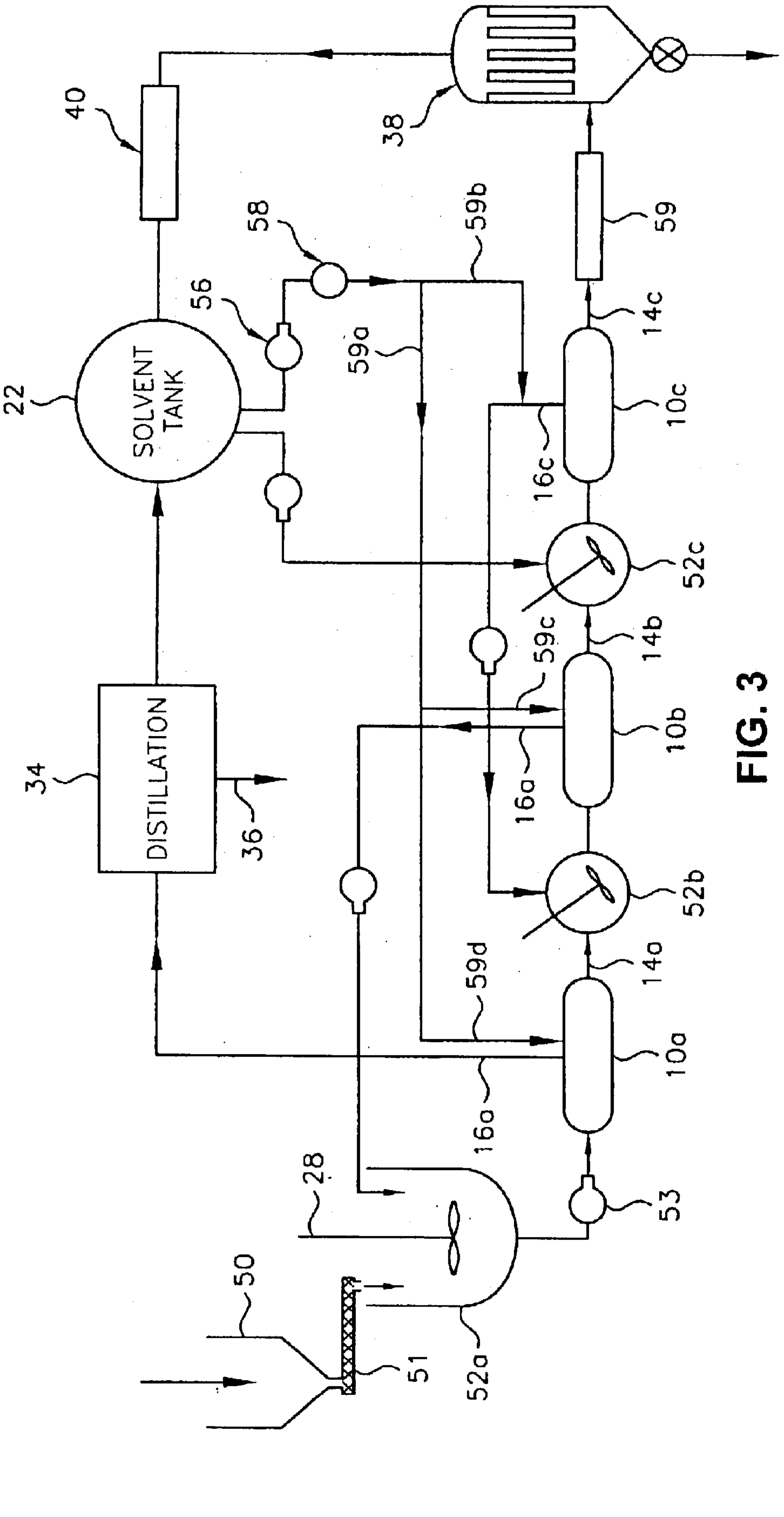
FIG. 3 is a schematic diagram of a system suitable for use in a continuous extraction process in accordance with the present invention.

Turning to the embodiment shown in FIG. 3, a continuous process for extracting oil from oil-bearing foodstuffs (or more generally a solute from a solute-bearing material) is shown. In this embodiment, an extraction feed material, such as cocoa powder, is placed in a feed silo 50. Metering screw 51, in communication with the interior of feed silo 50, serves to feed foodstuffs into extraction vessel 52*a*, which may be sealed from the atmosphere. Any number of ways to charge (and discharge) solids to the system can be used as are known in the art. These include an air lock and a double alternating chamber system. In addition, slurries can be metered in and removed via the use of positive displacement pumps, such as a diaphragm, piston, rotary gear, etc.

The foodstuffs are mixed in extraction vessel 52*a* with a liquid extracting medium to form a first mass. In the first batch of a continuous operation, the liquid extracting medium is pure solvent. In subsequent batches, it is preferable to utilize a miscella having an intermediate oil content as the liquid extracting medium applied to extraction vessel 52*a*, as will be discussed below. After a sufficient extraction time, the first mass is passed via pump 53 to a membrane filter 10*a* for separating a miscella exiting out permeate outlet 16*a* from a second mass having a reduced oil content exiting via retentate outlet 14*a*. This miscella, also known as full miscella, is directed to distillation unit 34 or to an intervening miscella storage tank (or tanks) for accumulation before being directed to distillation unit 34. At distillation unit 34, the miscella is distilled to form substantially pure solvent to be directed to solvent tank 22 and solute to be recovered as product via solute product line 36.

Returning to the mass exiting retentate outlet 14*a*, in some embodiments it may be acceptable to direct this mass directly to a heater/desolventizer 54 but, in most embodiments, it is desirable to direct this mass through at least one more extraction/separation stage through extraction vessel 52*b* and membrane filter 10*b*. Mixed with this mass in extraction vessel 52*b* is an extracting medium having a concentration of oil less than the concentration of oil in the extraction medium used at extraction vessel 52*a*. Preferably, this extracting medium applied to extraction vessel 52*b* is the miscella from the subsequent stage, namely, from permeate outlet 16*c*. As alluded to above, the miscella from permeate outlet 16*b* is directed to extraction vessel 52*a* to serve as the liquid extracting medium. Similarly, the miscella from permeate outlet 16*c* is directed to extraction vessel 52*b* as the liquid extracting medium for that extraction stage.

The mass having a reduced oil content exiting retenate outlet 14*c* is directed to heater/desolventizer 59 which serves to remove the solvent in this mass. In particular, heater/desolventizer 59 may heat and/or reduce the pressure in the mass to vaporize the solvent and lead this vaporized solvent having entrained particles to a baghouse or cyclone 38, which serves to separate the entrained particles from the gaseous solvent. The gaseous solvent is led to a condenser 40 where it is condensed and delivered to solvent tank 22.

As with the batch process, periodically a backflush process can be done to each of the membrane filters 10*a*–10*c*. In this regard, appropriate valves are placed and positioned to cause a flow from solvent tank 22 through high pressure pump 56, accumulator tank 58, and backflush lines 59*a*–59*d*. Each of these backflush lines enters into the permeate side of each respective membrane filter to dislodge any solids from filter sleeve 18 in a flow direction opposite the direction of normal flow. In the manner described above, the backflush step may comprise, in the case of defatting cocoa, applying a pressure drop of at least 75% of the pressure during extraction for a period of at least two seconds, preferably at least five seconds.

EXAMPLES

On a laboratory scale, a one cubic foot mixing tank was used to combine the ingredients described below and a positive displacement pump was used to withdraw the contents of the tank from the bottom and deliver them to a membrane filter sold under the trademark SCEPTER® by Graver Technologies, having a pore size of 0.1 microns with a titanium dioxide coating. The membrane filters had dimensions of two feet in length and 0.75 inches in diameter. A valve was placed at the retentate outlet of the membrane filter and a pressure gauge disposed between the valve and the retentate outlet to determine the back pressure. The retentate was then returned to the tank through a conduit. An indirect steam line was placed throughout the system, including a heating coil in the mixing vessel, to keep the temperature of the system above the melting temperature of cocoa butter.

In a first series of tests, chocolate liquor was added to the vessel and heated to 150° F. Back pressure was regulated to 50 PSI and the rate of pumping was four gallons per minute. The initial filtering rate was 18 ml/min which decreased asymptotically to 9.5 ml/min after one hour and to 6.2 ml/min after two hours. This rate reduction can be attributed to fouling, since all other conditions were held constant and the cocoa butter was returned and readded continuously to the extraction vessel.

In a second series of tests, when the back pressure was increased to 80 psi the filtrate rate increased to 9.2 ml/min as would be expected. However, it decreased to 6.6 ml/min and remained constant, again indicating that fouling occurred. Filtrate (cocoa butter) was continuously returned to the extraction vessel.

In a third series of tests, back flushing with air across the membrane restored the filtering rate. When operating at a back pressure of 80 psi, a 20 psi back pressure was not sufficient to restore flow, but at a back pressure of 50 psi, but preferably 70 psi, flow was restored to the original rate. Back pressure was applied for 1 sec., 2 sec., up to 5 seconds. At least 2 seconds were needed to restore the rate. In one test, it was found that back flushing every two minutes for two seconds was effective in producing an average filtrate rate of 252 gm/10 min., which equals to a flux rate of 8.3 lbs. per hour per square foot of membrane.

In a fourth series of tests, chocolate liquor was first filtered through the membrane to first reduce the concentration of cocoa butter until the filtrate rate was 15 ml/min. Then, a solvent, in this case hexane, was added. The filtration rate (of a mixture of cocoa butter and hexane) increased to 18 ml/min.

In all tests the filtrate contained no visible solids.

Although illustrated and described herein with reference to certain specific embodiments and examples, the present invention is nevertheless not intended to be limited to the details shown. Rather, various modifications may be made in the details within the scope and range of equivalents of the claims and without departing from the spirit of the invention.

What is claimed:

1. A system for extracting oil from oil-bearing foodstuffs comprising:

an extraction vessel operable for mixing a liquid extracting medium with solid foodstuffs having an oil content to form a first mass, wherein said extracting medium comprises a solvent;

a substantially tubular membrane filter, coupled to recieve said first mass from said extraction vessel and through which said first mass is conveyed and having an average pore size of between 0.1 microns and 10 microns, wherein said average pore size is selected to separate a miscella comprising a portion of said oil and said solvent from a second mass comprising said foodstuffs having a reduced oil content and said solvent;

a separator, coupled to said membrane filter and receiving said miscella from said membrane filter, for removing said solvent in said miscella to isolate said portion of said oil; and means for removing said solvent in said second mass to form reduced oil, desolventized foodstuffs.

2. A system in accordance with claim 1, wherein said foodstuffs comprise cocoa powder, said solvent is selected from propane or butane, and said membrane filter has an average pore size within the range of 0.1 to 1.0 microns.

3. A system in accordance with claim 1, wherein said membrane filter is external relative to said extraction vessel.

4. A system in accordance with claim 1, wherein said means for removing said solvent comprise a heater for heating said second mass to vaporize said solvent to form gaseous solvent and entrained particles and at least one of a baghouse or a cyclone for separating said entrained particles from said gaseous solvent, said system further comprising a condenser for condensing said gaseous solvent.

5. A system in accordance with claim 1, wherein said means for removing said solvent comprise a vacuum pump for reducing the pressure in said second mass to vaporize said solvent to form gaseous solvent and entrained particles and at least one of a baghouse or a cyclone for separating said entrained particles from said gaseous solvent, said system further comprising a condenser for condensing said gaseous solvent.

* * * * *